(12) United States Patent
Zheng

(10) Patent No.: US 7,995,307 B2
(45) Date of Patent: *Aug. 9, 2011

(54) PERPENDICULAR MAGNETIC RECORDING WRITE HEAD WITH TRAILING SHIELD HAVING THROAT HEIGHT DEFINED BY ELECTROPLATED NONMAGNETIC PAD LAYER AND METHOD FOR MAKING THE HEAD

(75) Inventor: Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1040 days.

This patent is subject to a terminal disclaimer.

(21) Appl. No.: 11/780,148

(22) Filed: Jul. 19, 2007

(65) Prior Publication Data
US 2009/0021863 A1    Jan. 22, 2009

(51) Int. Cl.
*G11B 5/127*    (2006.01)
(52) U.S. Cl. ............... 360/125.13; 360/125.3
(58) Field of Classification Search ............. 360/125.03, 360/125.3, 125.13
See application file for complete search history.

(56) References Cited

U.S. PATENT DOCUMENTS

| 6,884,148 | B1 | 4/2005 | Dovek et al. | |
|---|---|---|---|---|
| 7,002,775 | B2 | 2/2006 | Hsu et al. | |
| 7,140,095 | B2 | 11/2006 | Matono et al. | |
| 7,532,432 | B2 * | 5/2009 | Ikeda et al. | 360/125.02 |
| 2005/0068673 | A1 * | 3/2005 | Lille | 360/126 |
| 2005/0219752 | A1 | 10/2005 | Takahashi | |
| 2006/0082924 | A1 * | 4/2006 | Etoh et al. | 360/125 |
| 2006/0092564 | A1 * | 5/2006 | Le | 360/126 |
| 2006/0168798 | A1 | 8/2006 | Naka | |
| 2006/0215314 | A1 | 9/2006 | Chen et al. | |
| 2007/0127157 | A1 * | 6/2007 | Nishiyama et al. | 360/126 |
| 2007/0146930 | A1 * | 6/2007 | Hsu et al. | 360/125 |
| 2007/0217069 | A1 * | 9/2007 | Okada et al. | 360/126 |
| 2008/0278855 | A1 * | 11/2008 | Guthrie et al. | 360/236.5 |

* cited by examiner

*Primary Examiner* — Jefferson Evans
(74) *Attorney, Agent, or Firm* — Thomas R. Berthold

(57) ABSTRACT

A perpendicular magnetic recording write head has a magnetic write pole (WP) and a trailing shield (TS). The TS has a height (TS-HT) and a throat height (TS-TH) in a direction perpendicular to the ABS, with TS-TH being less than TS-HT. Nonmagnetic material is located between the TS and the WP and separates the TS from the WP. The nonmagnetic material includes a gap layer and a nonmagnetic electroplated "bump" or pad between the WP and the TS. The pad has a front edge generally parallel to and recessed from the ABS so that the TS-TH is generally equal to the distance from the ABS to the pad's front edge. An electrical lapping guide (ELG) is formed adjacent to the write head, with the back edge of the ELG being defined in the same process step that defines the location of the recessed front edge of the electroplated pad.

7 Claims, 11 Drawing Sheets

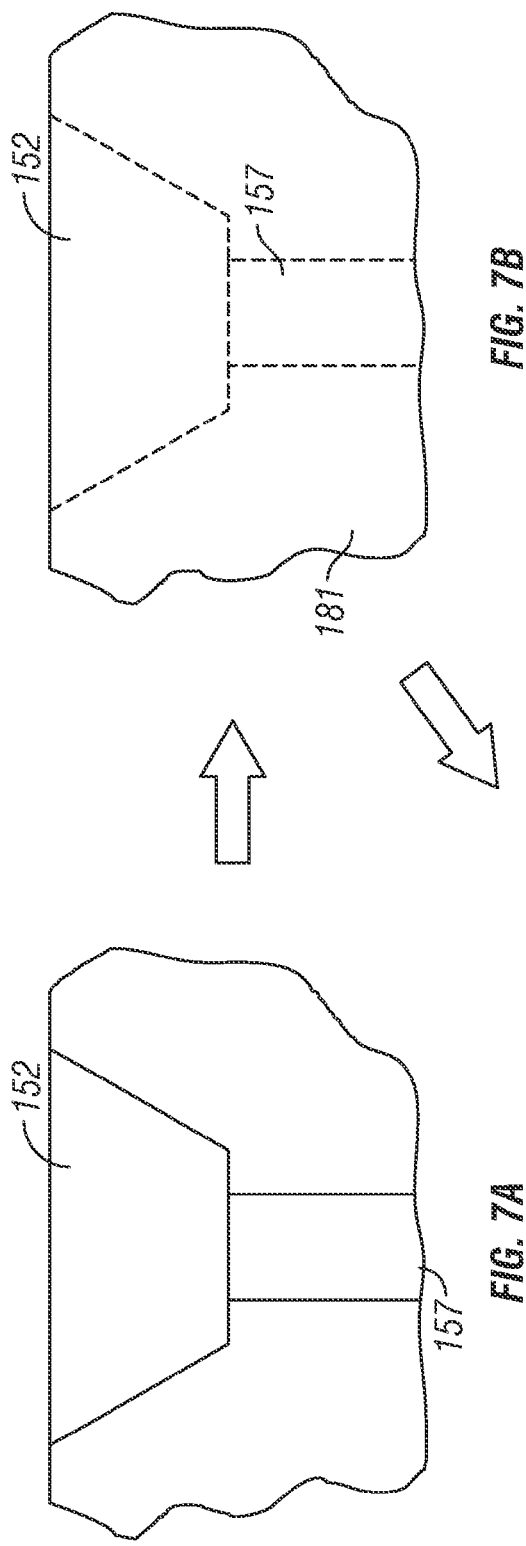
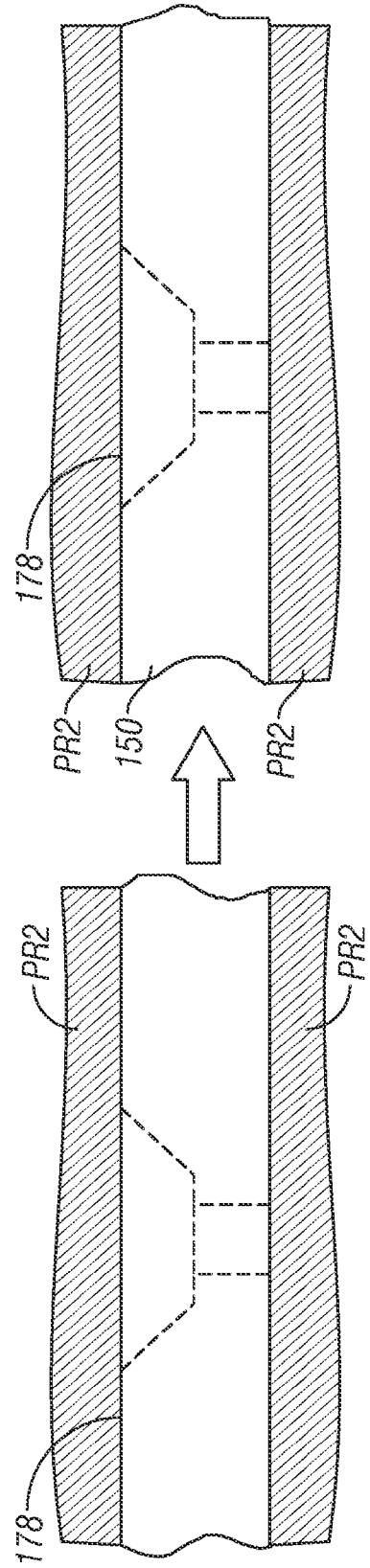
FIG. 7A  FIG. 7B  FIG. 7C  FIG. 7D

PERPENDICULAR MAGNETIC RECORDING WRITE HEAD WITH TRAILING SHIELD HAVING THROAT HEIGHT DEFINED BY ELECTROPLATED NONMAGNETIC PAD LAYER AND METHOD FOR MAKING THE HEAD

BACKGROUND OF THE INVENTION

1. Field of the Invention

This invention relates generally to perpendicular magnetic recording write heads for use in magnetic recording disk drives, and more particularly to a write head with a trailing shield.

2. Description of the Related Art

Perpendicular magnetic recording, wherein the recorded bits are stored in a perpendicular or out-of-plane orientation in the recording layer, is a promising path toward ultra-high recording densities in magnetic recording hard disk drives. The recording or write head in perpendicular magnetic recording disk drives includes a write pole for directing magnetic field to data tracks in the recording layer, and one or more return poles for return of magnetic flux from the recording layer. The write head may also include a trailing shield (TS) of magnetically permeable material that faces the recording layer and is spaced from the write pole by a nonmagnetic gap. The use of a TS separated from the write pole by a nonmagnetic gap slightly alters the angle of the write field and makes writing more efficient. The TS must be very short as measured in the generally perpendicular direction, i.e., perpendicular to the recording layer. This dimension is called the TS "throat height" (TH). However, it is difficult to reliably fabricate a TS to very small thicknesses. For that reason a nonmagnetic TS "bump" or pad may be located between the gap and a portion of the TS. The TS pad has a recessed front edge and allows the TS to have a TH shorter that the overall height of the remaining portion of the TS. A perpendicular magnetic recording write head with a TS and a TS pad is described in pending application Ser. No. 11/090456 filed Mar. 25, 2005, published as US2006/215314 A1, and assigned to the same assignee as this application.

It is difficult to precisely define the location of the recessed front edge of the nonmagnetic pad so as to control the TH of the TS. What is needed is a perpendicular magnetic recording write head, and an improved method for making it, that has a trailing shield with a nonmagnetic pad with a precisely defined throat height.

SUMMARY OF THE INVENTION

The invention is a perpendicular magnetic recording write head that may be used in magnetic recording disk drives. In a disk drive implementation the write head is formed on the trailing surface of a head carrier or slider that has an air-bearing surface (ABS) oriented generally perpendicular to its trailing surface and generally parallel to the surface of the disk during operation of the disk drive. The write head has a magnetic write pole (WP) on the trailing surface with a WP end at the ABS that has a width in the cross-track direction that is generally the same as the width of the data tracks on the disk. A trailing shield (TS) is formed on the WP and has a TS end generally coplanar with the WP end. The TS has a height (TS-HT) in a direction perpendicular to the ABS, and a throat height (TS-TH) in a direction perpendicular to the ABS that is less than TS-HT. Nonmagnetic material is located between the TS and the WP and separates the TS from the WP. The nonmagnetic material includes a gap layer and a nonmagnetic electroplated "bump" or pad between the WP and the TS. The pad has a front edge generally parallel to and recessed from the ABS so that the TS-TH is generally equal to the distance from the ABS to the pad's front edge. The write head may also include side shields of magnetically permeable material spaced on opposite sides of the WP end in the cross-track direction. The side shields may be in contact with the TS to form a wraparound shield (WAS) around the WP.

In the method for forming the nonmagnetic pad, a nonmagnetic metal electroplating seed layer is deposited on the gap layer, a layer of etchable material is deposited on the electroplating seed layer, and a first layer of photoresist is patterned on the etchable material to leave a portion of the first photoresist layer near the WP end with a back edge recessed from the WP end. The etchable material is removed by reactive ion etching (RIE), and then the nonmagnetic metal pad layer is electroplated onto the electroplating seed layer to form the nonmagnetic pad layer on the WP, with the front edge of the pad layer being coincident with the back edge of the patterned first layer of photoresist.

As part of the fabrication method for the write head, an electrical lapping guide (ELG) of electrically conductive material is formed adjacent to the WP by a deposition and liftoff method. When the etchable material is deposited on the electroplating seed layer it is also deposited on the electrically conducting ELG layer. The patterning of the first layer of photoresist also involves patterning it on the ELG layer to have a back edge generally collinear with the back edge of the first photoresist layer over the WP. The portion of the ELG layer that is not covered by the photoresist is then exposed to RIE, which removes the etchable material from the ELG layer. This leaves the ELG layer with its back edge generally collinear with the front edge of the pad. Thus the same lithography step that defines the recessed front edge of the pad also defines the back edge of the ELG, which allows the TS-TH to be precisely defined during the subsequent lapping process.

The slider is then lapped while the electrical resistance of the ELG is monitored. When a predetermined resistance value is achieved lapping stops. This defines generally the air-bearing surface (ABS) of the slider and thus the TS-TH because the back edge of the ELG has been aligned with the front edge of the TS pad.

For a fuller understanding of the nature and advantages of the present invention, reference should be made to the following detailed description taken together with the accompanying figures.

BRIEF DESCRIPTION OF THE DRAWING

FIGS. 6A, 6B and 6C are views of the electrical lapping guide (ELG) showing successive processing steps in the fabrication of the ELG.

FIGS. 7A, 7B, 7C and 7D are views of the write head structure showing processing steps in the fabrication of the write head shown in FIGS. 2A-2B.

DETAILED DESCRIPTION OF THE INVENTION

Figure 1:
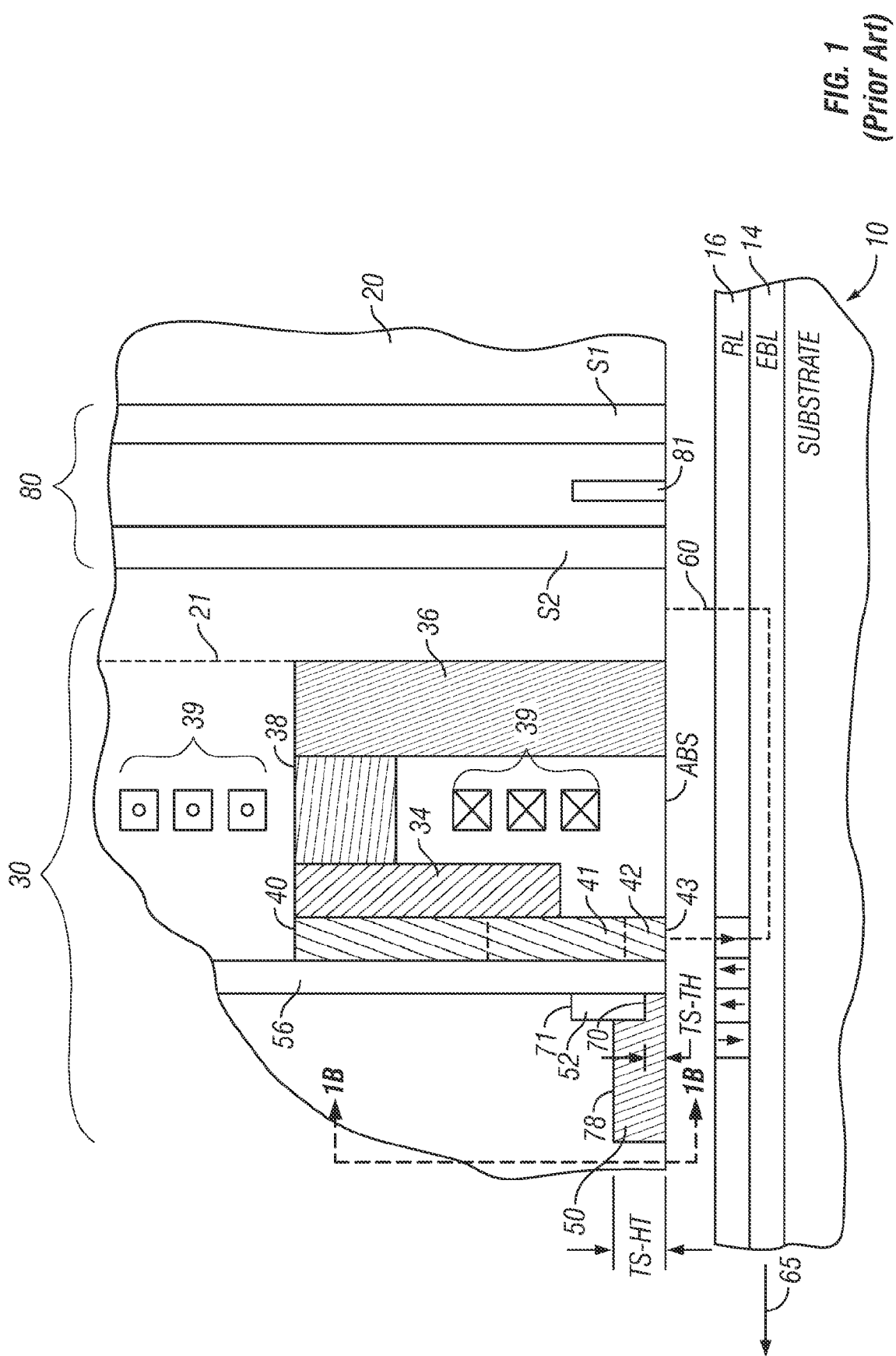
FIG. 1A is a side sectional view of a prior art perpendicular magnetic recording system showing a read head, a write head, and a recording medium.
FIG. 1B is a view in the direction 1B-1B of FIG. 1A and shows the write pole (WP), the wraparound shield (WAS), and the trailing shield (TS) pad for defining the TS throat height (TS-TH).
FIG. 1C is a view from the air-bearing surface (ABS) of the write head and read head in FIG. 1A and shows the WAS.
Figure 1A:
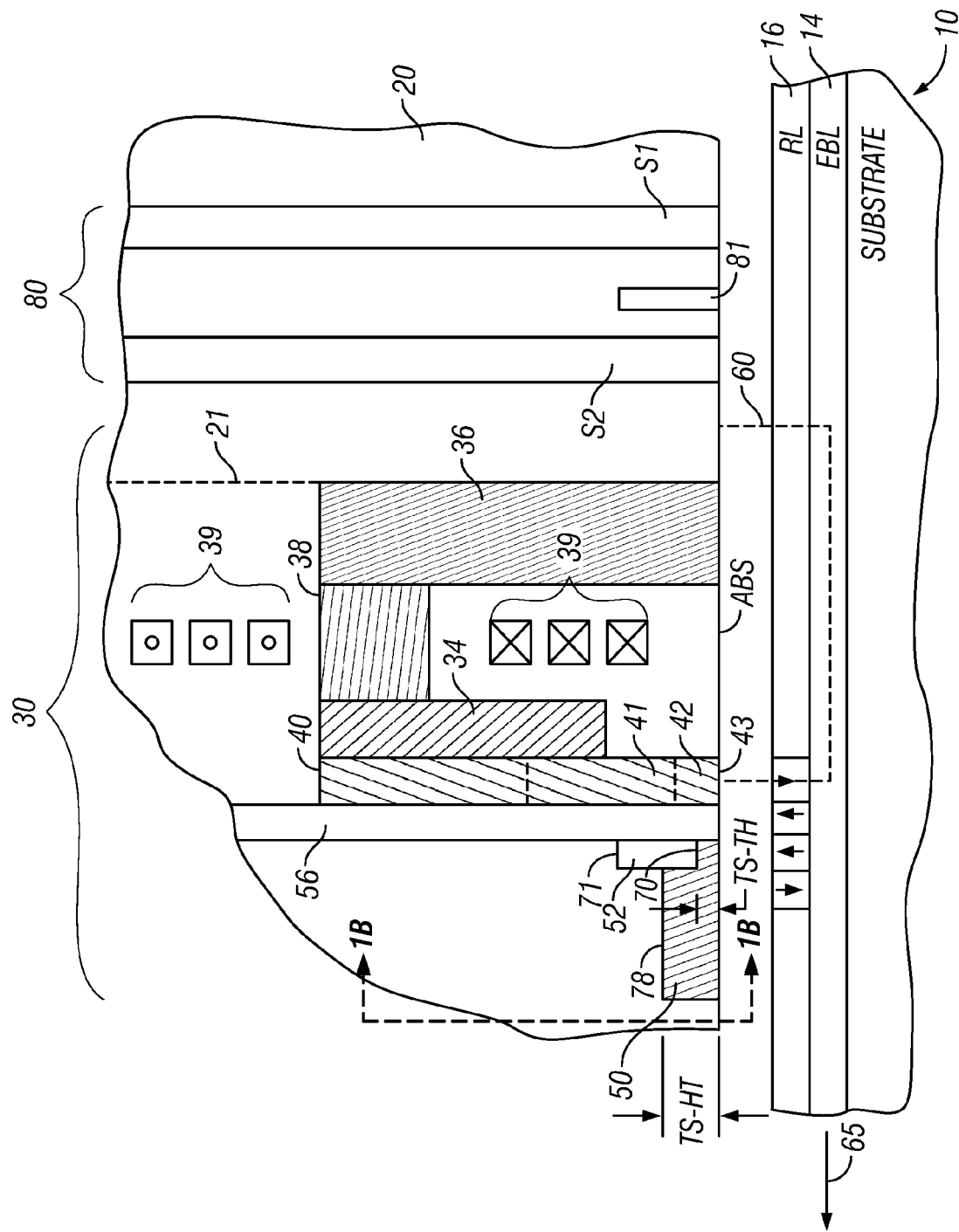

FIG. 1A is a side sectional view of a prior art perpendicular magnetic recording write head, read head and a recording medium taken through a central plane that intersects a data track on the medium. As shown in FIG. 1A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a single write pole type of recording or write head 30. The recording head 30 includes a yoke made up of the main pole 34, flux return pole 36, and yoke stud 38 connecting the main pole and return pole 36; and a thin film coil 39 shown in section wrapped around yoke stud 38. A flared write pole (WP) 40 is part of the main pole 34 and has a flared portion 41 and a pole tip 42 with an end 43 that faces the outer surface of medium 10. Write current through coil 39 induces a magnetic field (shown by dashed line 60) from the WP 40 that passes through the RL 16 (to magnetize the region of the RL 16 beneath the WP 40), through the flux return path provided by the SUL 14, and back to the return pole 36. The recording head is typically formed on a trailing surface 21 of an air-bearing slider 20 that has its air-bearing surface (ABS) supported above the surface of medium 10.

A magnetoresistive (MR) read head 80 comprised of a MR sensing element 81 located between MR shields S1 and S2 is also deposited on the trailing end of the slider 20 prior to the deposition of the layers making up the write head 30. As depicted in FIG. 1A, trailing surface 21 may be a nonmagnetic layer deposited on the MR shield S2. In FIG. 1A, the medium 10 moves past the recording head 30 in the direction indicated by arrow 65, so the portion of slider 20 that supports the MR head 80 and write head 30 is often called the slider "trailing" end, and the surface perpendicular to the slider ABS on which the write head 30 is located is often called the "trailing" surface.

The RL 16 is illustrated with perpendicularly recorded or magnetized regions, with adjacent regions having opposite magnetization directions, as represented by the arrows. The magnetic transitions between adjacent oppositely-directed magnetized regions are detectable by the MR sensing element 81 as the recorded bits.

FIG. 1A also illustrates a trailing shield (TS) 50 and a TS pad 52 that are separated from WP 40 by a nonmagnetic gap layer 56. The TS 50 has a throat height (TH) defined generally as the distance between the ABS and a front edge 70 of the TS pad 52. The TS 50 has a total height (TS-HT), in the direction perpendicular to the ABS, defined generally by the ABS and a back edge 78. The TS 50 is formed of magnetically permeable material and TS pad 52 is formed of nonmagnetic material. The TS 50 separated from the WP 40 by nonmagnetic gap 56 slightly alters the angle of the write field and makes writing more efficient. The portion of the TS that first receives the flux from WP 40 must be very thin, for example about 50 nm. However, it is difficult to reliably fabricate a TS to such small thicknesses. For that reason a nonmagnetic TS "bump" or pad 52 is used. The TS pad 52 has a front edge 70 near the ABS and a back edge 71 recessed from the front edge 70. The TS pad 52 allows the TS to have a TH much thinner that the height of the remaining portion of the TS. A perpendicular magnetic recording write head with a TS and a TS pad, like that depicted in FIG. 1A, is described in pending application Ser. No. 11/090456 filed Mar. 25, 2005, published as US2006/215314A1, and assigned to the same assignee as this application.

Figure 1B:
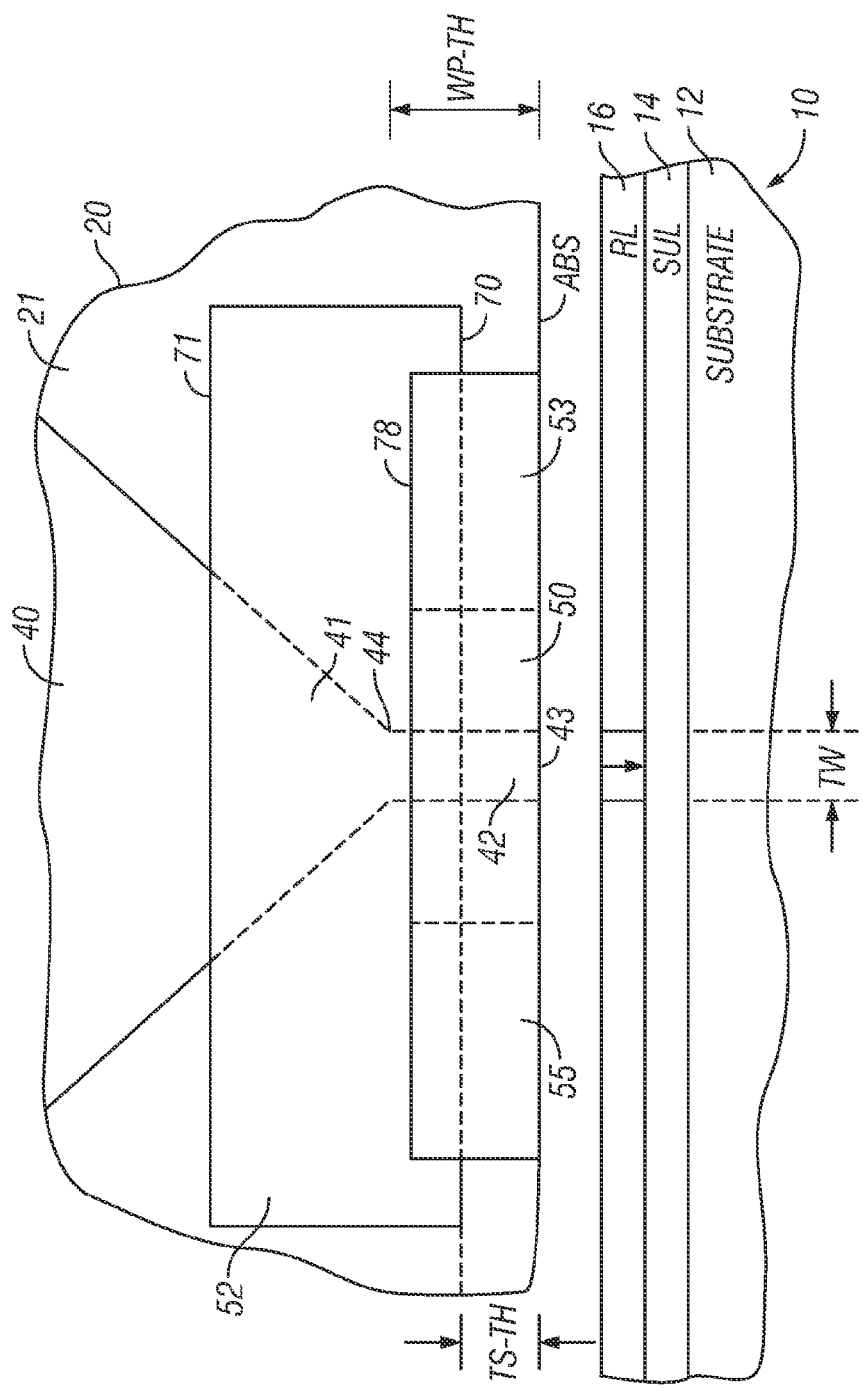

FIG. 1B is a view in the direction 1B-1B of FIG. 1A to illustrate the WP 40, the TS 50 and the TS pad 52 on trailing surface 21 of slider 20. To simplify the illustration of FIG. 1B, neither the gap layer 56 nor the layers between WP 40 and the surface 21, shown in FIG. 1A, are shown in FIG. 1B. The region between the WP tip 42 and the flare portion 41 is called the flare point 44. The flare point 44 of the WP 40 is sometimes referred to as the "choke" point because it is the point where the flux density is highest and where the WP 40 saturates. The WP tip 42 has a throat height (WP-TH) which is generally the distance from end 43 to flare point 44. As shown in FIG. 1B, the two side walls of WP tip 42 define its width in the cross-track direction, which substantially defines the trackwidth (TW) of the data recorded in the RL 16. The region of the WP 40 above the flare region 41 is substantially wider than WP tip 42 below the flare region 41 and the flare point 44 is recessed from the ABS and is the transition point where the WP 40 begins to widen with distance from the ABS. The flare angle between flare region 41 and WP 42 is between 90 and 180 degrees, typically between about 120 and 150 degrees.

FIG. 1B also illustrates the TS 50 and TS pad 52. The portions identified as 53, 55 on opposite ends of TS 50 are side shields which, together with TS 50 form a wraparound shield (WAS) that generally surrounds the WP tip 42. The TH for the TS 50 is the distance from the ABS to the front edge 70 of the TS pad 52.

Figure 1C:
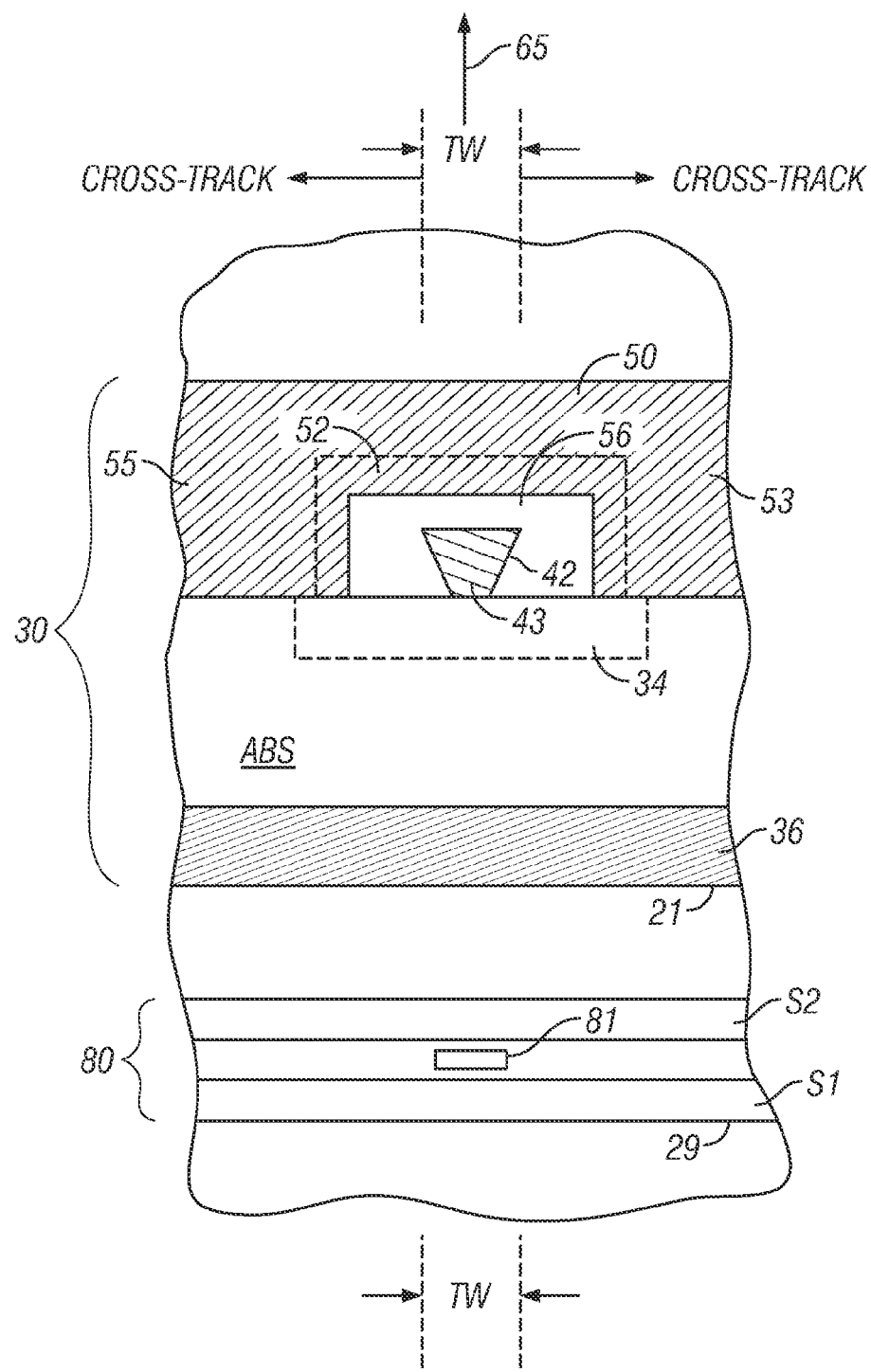

FIG. 1C illustrates the write head 30 as seen from the recording medium 10. The ABS is the recording-layer-facing surface of the slider that faces the medium 10 and is shown in FIG. 1C without the thin protective overcoat typically present in an actual slider. The recording-layer-facing surface shall mean the surface of the slider 20 that is covered with a thin protective overcoat, the actual outer surface of the slider if there is no overcoat, or the outer surface of the overcoat. The phrase "substantially at the recording-layer-facing surface" shall mean actually at the surface or slightly recessed from the surface. The recording medium 10 moves relative to the head 30 in the direction 65, which is called the along-the-track direction. The direction perpendicular to direction 65 and parallel to the plane of the ABS is called the cross-track direction. The width of the end 43 of WP tip 42 in the cross-track direction substantially defines the track-width (TW) of the data tracks in the RL 16. The main pole 34 is shown with dashed lines because it is recessed from the ABS (see FIG. 1A).

The WAS that includes side shields 53, 55 and TS 50 is described in detail as a shield for a conventional perpendicular recording head in U.S. Pat. No. 7,002,775 B2, assigned to the same assignee as this application. The shields 50, 53, 55 all have ends substantially at the recording-layer-facing surface. The shields 50, 53, 55 are typically connected to one another and substantially surround the WP tip 42 to from the WAS. The TS 50 and side shields 53, 55 are separated from WP tip 42 by nonmagnetic gap material, typically alumina, which forms the gap layer 56. The WAS separated from the WP tip 42 by gap layer 56 alters the angle of the write field and improves the write field gradient at the point of writing, and also shields the writing field at regions of the medium 10 away from the track being written. The WAS is shown as a "floating" shield, meaning that is not connected to the return pole 36. However, the WAS may be connected to either the return pole 36 or other portions of the yoke by flux-conducting material. In other variations of the write head 30, only a TS may be used without side shields. The TS may be either "floating" or connected to return pole 36.

FIG. 1C also illustrates the magnetoresistive (MR) read head 80 that includes the MR sensor 81 located between MR shields S1, S2. The films making up MR head 80 and write head 30 as shown in FIG. 1C are formed in succession on the trailing end of air-bearing slider 20, by a series of thin film deposition, etching and lithographic patterning processes. As shown in FIG. 1C, the films making up (MR) read head 80 are formed on substrate surface 29 and the films making up write head 30 are formed on substrate surface 21, which is typically a layer of nonmagnetic material, like alumina, that separates write head 30 from read head 80.

The yoke and shields of write head 30 are formed of soft ferromagnetic material, such as alloys of NiFe, CoFe and NiFeCo that are typically formed by electroplating. The WP 40 is formed of a high-moment material, such as a high-moment CoFe alloy, that is typically formed by sputter deposition, and may be a laminated structure.

Figure 2A:
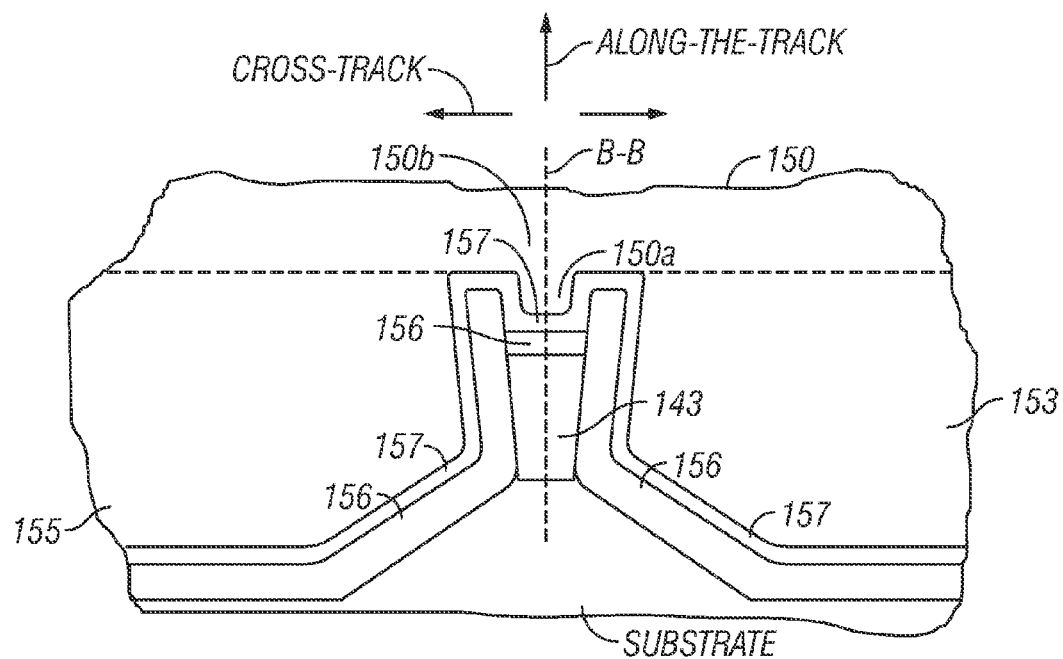
FIG. 2A is a view from the air-bearing surface (ABS) of the write head according to this invention.
Figure 2B:
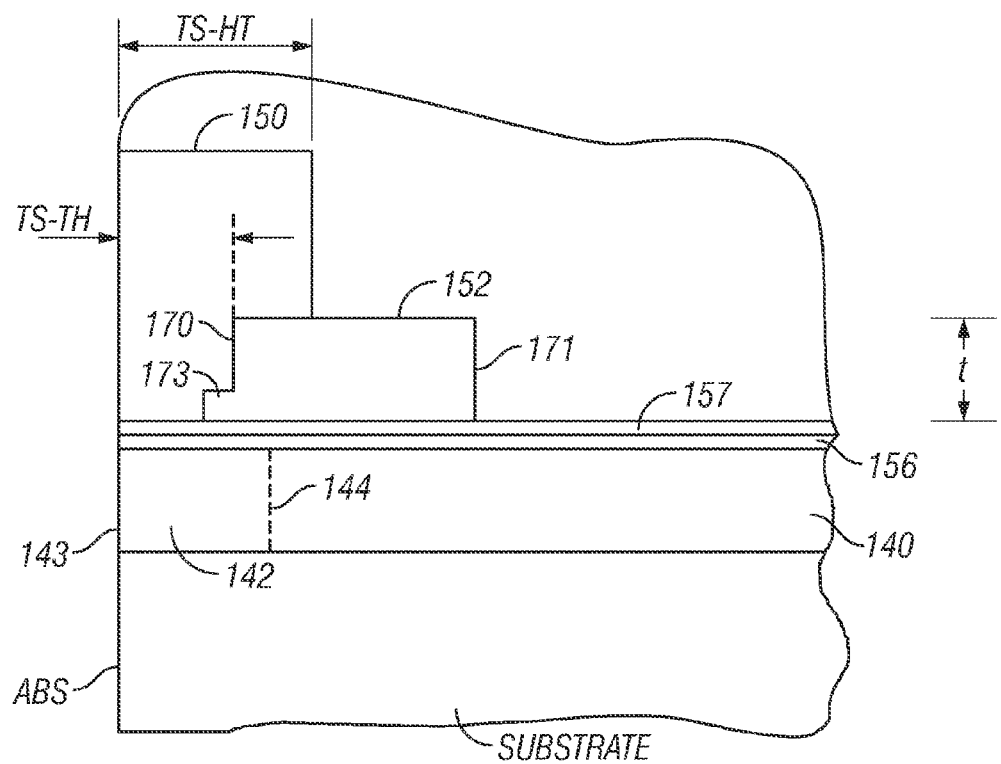
FIG. 2B is a sectional view through plane B-B of FIG. 2A, which is a central plane that intersects a data track on the medium.

FIG. 2A is a view from the ABS of the write head according to this invention and FIG. 2B is a sectional view through plane B-B of FIG. 2A, which is a central plane that intersects a data track on the medium. The write head includes a WP 140, having a WP tip 142, end 143 and flare point 144, formed as a layer of magnetic material on the substrate. A nonmagnetic gap layer 156 is formed on WP 140. A nonmagnetic metal layer 157, used as an electroplating seed layer as described below, is formed on gap layer 156, and an electroplated nonmagnetic pad layer 152 is formed on electroplating seed layer 157. Pad layer 152 is formed of nonmagnetic metal and is electroplated onto electroplating seed layer 157 as part of the method of this invention as described below. Pad layer 152 has a front edge 170 and back edge 171 and is electroplated to a thickness t. A TS 150 is formed over the WP 140 and pad layer 152. As shown in FIG. 2A, the TS 150 has a first portion 150b that is substantially wider in the cross-track direction that the cross-track width of WP end 143. The TS first portion 150b has a height (TS-HT) measured from the ABS to back edge 178, as shown in FIG. 2B. The TS 150 also has an optional notch portion 150a that faces the WP and is called the TS notch (TSN). TSN 150a has a cross-track width generally the same as the cross-track width of WP end 143. The TS 150 has a throat height (TS-TH) defined generally by the distance from the ABS to front edge 170 of pad layer 152, with TS-TH being less than TS-HT. As a result of the manufacturing method described below, the front edge 170 of the TS 150 also has a lip portion 173 located closer to the ABS.

FIG. 2A also shows side shields 153, 155 spaced on opposite sides of WP tip 142 with end 143. The side shields 153, 155 and TS 150 are separated from WP 142 by nonmagnetic gap 156 and electroplating seed layer 157. Side shields 153, 155 and TS 150 are connected to form a WAS that generally surrounds WP 140.

Figure 3A:
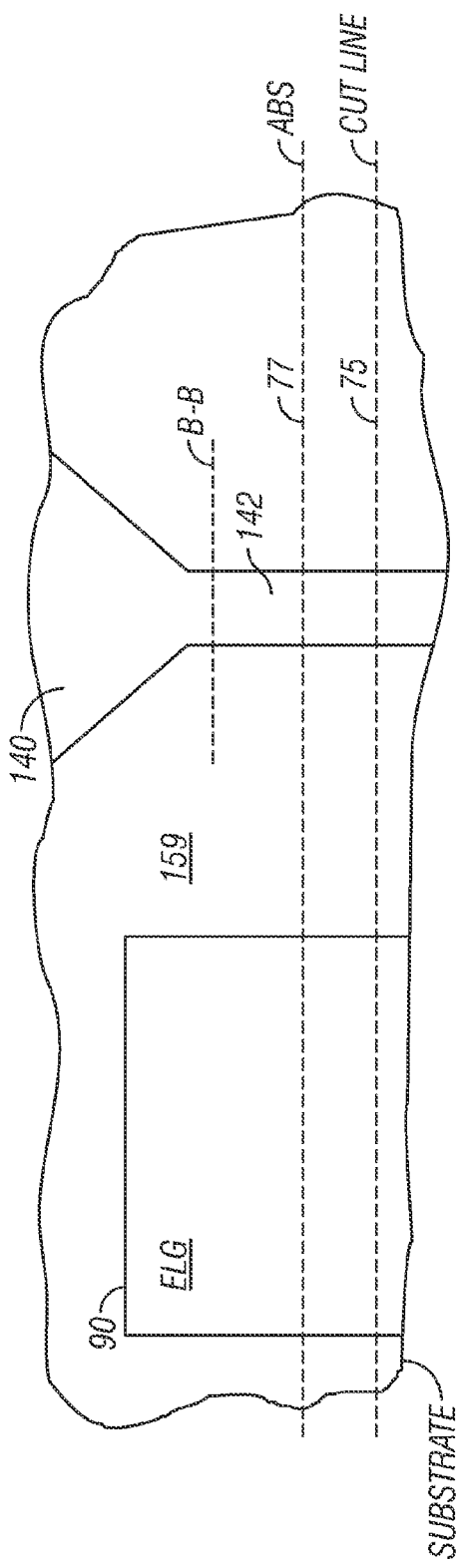
FIGS. 3A and 3B are views of the structure during a processing step in the fabrication of the write head shown in FIGS. 2A-2B.
Figure 3B:
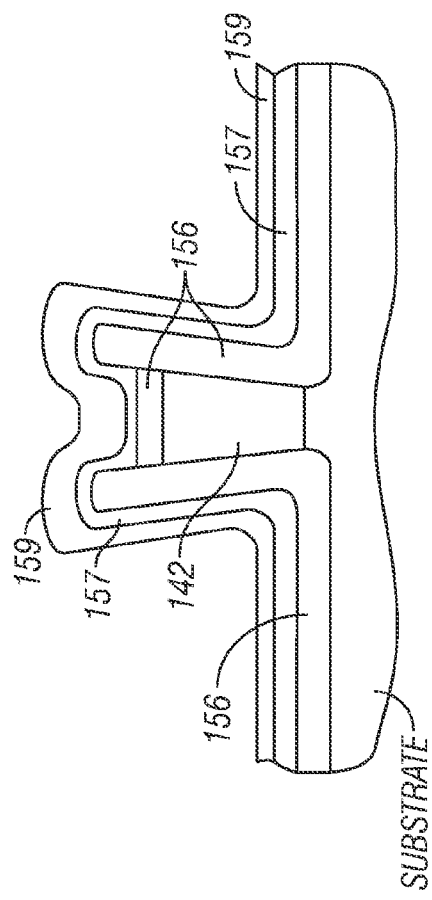
Figure 8:
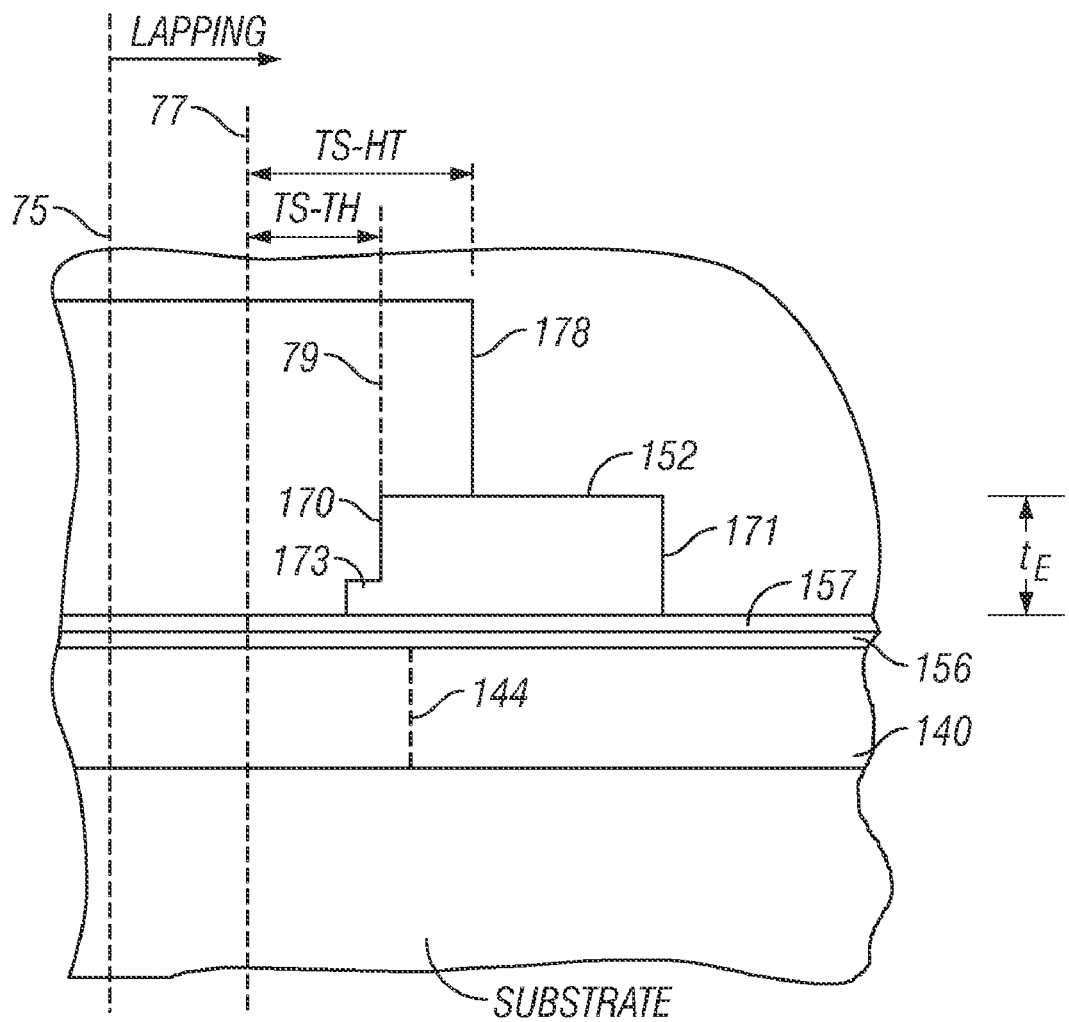
FIG. 8 is a sectional view of the write head structure illustrating the lapping process.

FIGS. 3A-B through FIG. 8 inclusive illustrate the processing steps in fabricating the write head shown in FIGS. 2A-2B. Prior to the processing steps illustrated in FIGS. 3A-B through FIG. 8, a full film layer of magnetic WP material is deposited on the substrate to a thickness corresponding to the desired thickness of the WP, typically in the range of about 100 to 250 nm. The WP layer is high-moment magnetic material, such as CoFe or NiFe, and is formed by sputtering or electroplating. A full film of alumina as the gap layer is deposited over the WP layer, typically by sputtering, and serves as a "thin alumina mask" (TAM) during subsequent ion milling to form the shape of the WP. Other materials that may serve as the gap layer include tantalum-oxide, silicon-oxide, silicon-nitride or diamond-like carbon. The gap layer is typically formed to a thickness in the range of about 20 nm to 60 nm and will serve as the gap layer 156 (FIG. 2A) between the WP tip 142 and the TS 150. A layer of organic photoresist (PR) is deposited and patterned above the gap layer and underlying WP layer and to have the shape of the of the WP. Reactive ion etching (RIE) and ion milling then removes portions of the layers not protected by the patterned PR layer.

FIG. 3A and FIG. 3B, which is a sectional view through plane B-B of FIG. 3A, illustrate the first steps of the process of this invention after the WP has been formed as described above. FIG. 3A is a view of the substrate surface of a wafer on which the write head is fabricated and shows the WP 140 at one point in the process of this invention. The wafer is later cut into rows and the rows then cut into individual sliders. A line 75 is shown as a cut line for separating the wafer into rows. After separation into rows, the rows are later cut into the individual sliders. Eventually the sliders are lapped, either individually or at the row level, to remove material between cut line 75 and line 77, to form the ABS. In the process of this invention an electrical lapping guide (ELG) layer 90 of electrically conductive material is also formed on the substrate surface adjacent to the WP 140. As is well known in disk drive read/write head fabrication technology, an ELG is used to control the lapping so that lapping is stopped at the precise line desired for the ABS. The electrical resistance is measured and as the ELG material is removed, lapping is terminated when the resistance reaches a predetermined value. The ELG layer 90 is preferably gold (Au) sputter deposited to a thickness of about 25 nm, but other electrically conductive materials may also be used, such as Rh, Ru and NiCr. In the process of this invention the ELG layer 90 becomes patterned in the same lithographic step that patterns the shape of the pad layer 152, so that the ELG is later used to precisely define the TS-TH, as described below.

As shown in the sectional view of FIG. 3B, a nonmagnetic metal electroplating seed layer 157 is deposited. This material may be a thin (about 20 nm) film of Rh, Ru, Ir, or other nonmagnetic metal or metal alloy. This is followed by a layer 159 of "etchable" material, preferably silicon nitride ($Si_3N_4$) of about 50 nm thickness. The term "etchable" means that the material of layer 159 can be etched by fluorine-based RIE at a faster rate than a photoresist material that will be later deposited on top of it. In addition to $Si_3N_4$, other materials usable for the etchable material include $SiO_2$ and silicon oxynitride ($SiO_xN_y$). Thus, in FIG. 3A, both the ELG layer 90 and the WP 140 are covered by layers 157 and 159, with the etchable layer 159 being the upper surface.

Figure 4A:
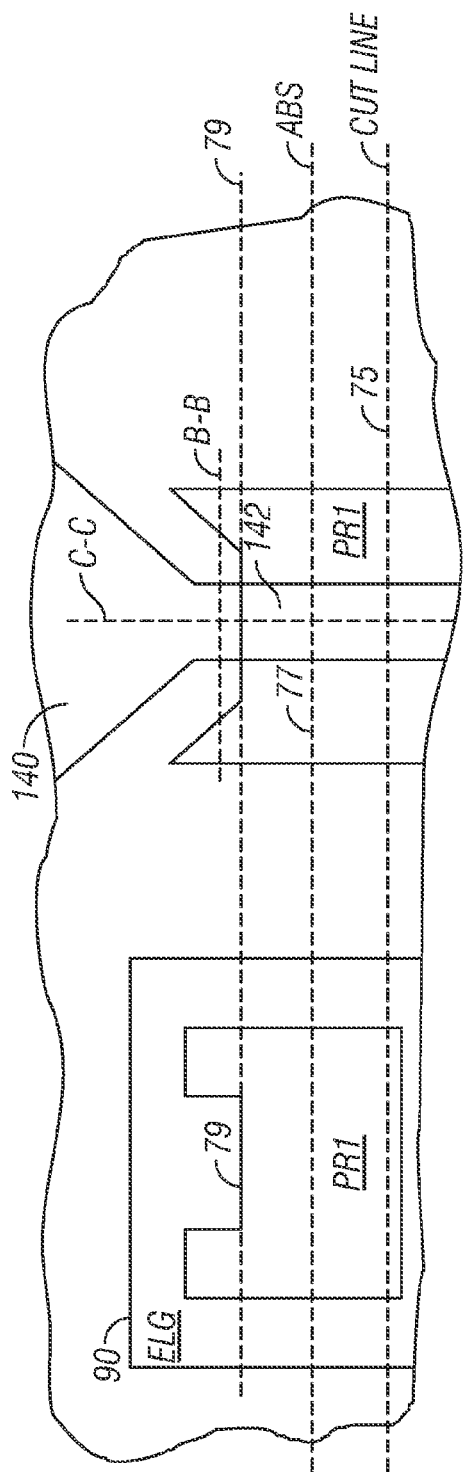
FIGS. 4A, 4B and 4C are views of the structure during a processing step in the fabrication of the write head shown in FIGS. 2A-2B.
Figure 4B:
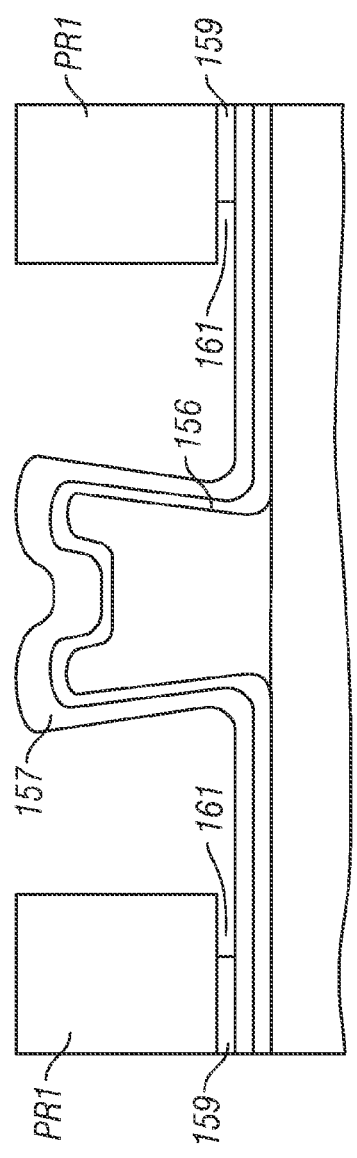
Figure 4C:
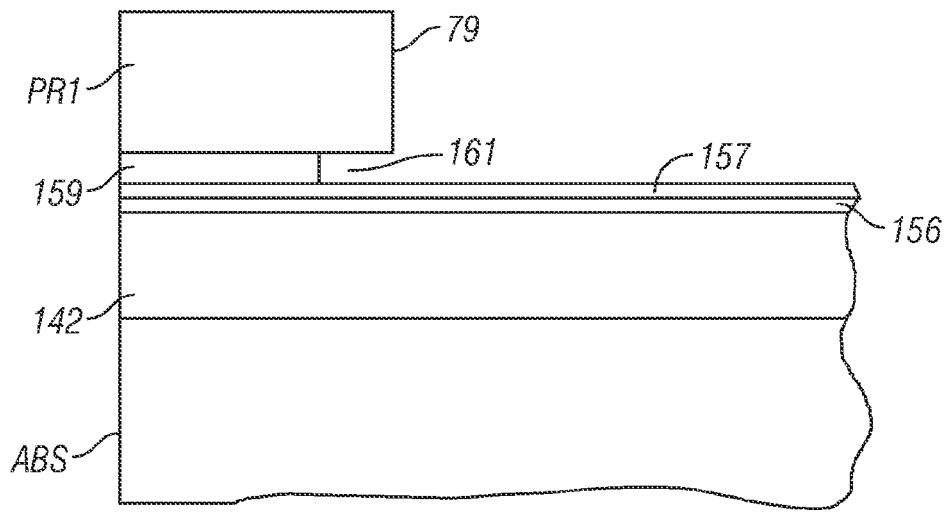

Next, a first layer of photoresist (PR1) is deposited and patterned to define both a shape of the ELG and the shape of the pad layer 152. After patterning and removal of the developed PR1, an RIE is performed to remove the etchable layer 159. The resulting structure is shown in FIGS. 4A-4C. FIG. 4B is a sectional view through plane B-B in FIG. 4A and FIG. 4C is a sectional view through plane C-C in FIG. 4A. The PR1 material is a thick photoresist, like a 248 nm wavelength-sensitive deep ultraviolet (DUV) resist, and the RIE is a process using fluorine-based (e.g., CF$_4$ based) chemistry. This type of RIE etches the silicon nitride of layer 159 much faster than the PR1, which results in undercut regions 161 beneath the PR1 layer. The silicon nitride material of layer 159 remains under the PR1 layer on both the ELG layer 90 and the WP 140. FIG. 4A shows line 79 which is the back edge of both the PR1 pattern that will become the patterned ELG and the back edge of the PR1 over WP tip 142.

Figure 5A:
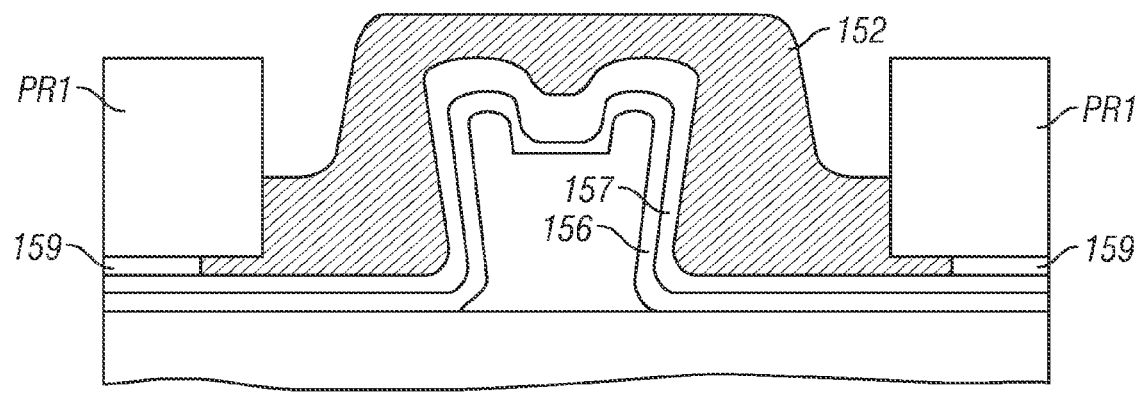
FIGS. 5A and 5B are views of the structure during a processing step in the fabrication of the write head shown in FIGS. 2A-2B.
Figure 5B:
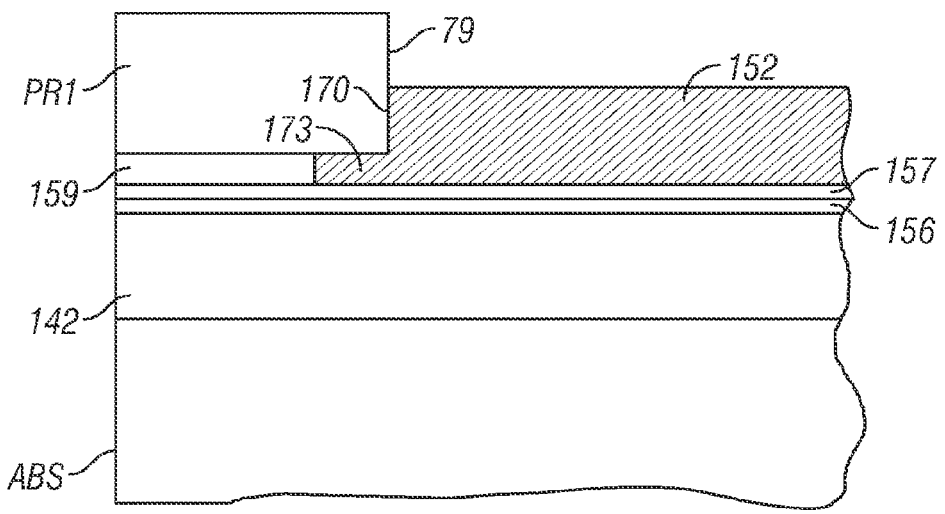

Next, a layer of nonmagnetic metal or metal alloy is electroplated on the electroplating seed layer 157 in the regions not covered by PR1 to form the pad layer 152. This material is preferably NiP, Cu or Pd and is electroplated to a thickness of about 0.5 microns. FIGS. 5A and 5B, corresponding to FIGS. 4B and 4C, respectively, show the structure after electroplating. This results in the formation of electroplated nonmagnetic pad layer 152 with front edge 170 recessed from the ABS, as shown in FIG. 5B. The pad layer front edge 170 is thus generally coincident with the back edge 79 of the PR1 layer above the WP tip 142. The electroplated material of pad layer 152 has also been plated into the undercut region beneath PR1, resulting in the pad layer 152 having a lip region 173 with its front edge located closer to the ABS than front edge 170.

Figure 6C:
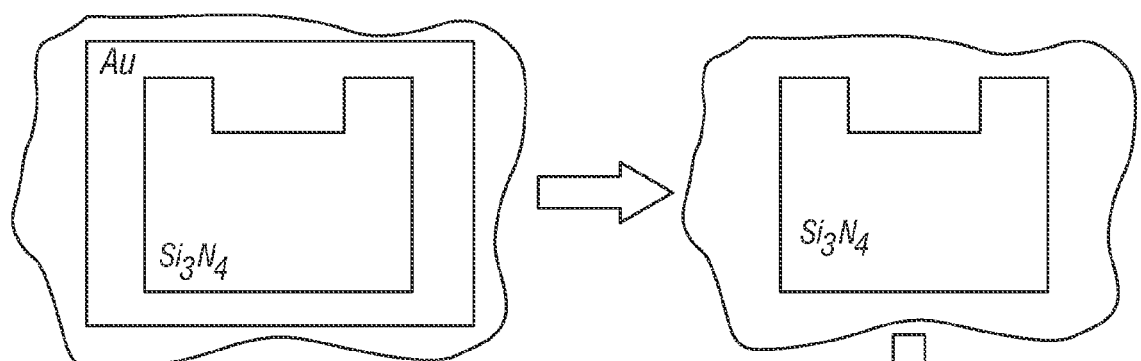
Figure 6C:
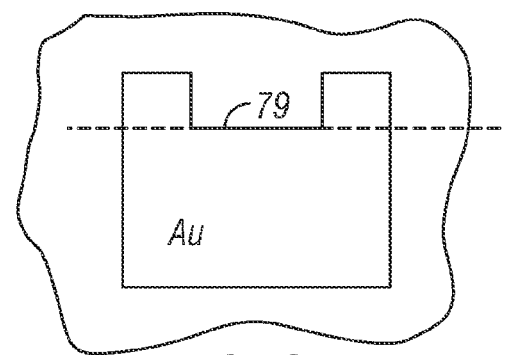

Next, the PR1 is stripped. Then the ELG area is exposed to a wet etch to remove the electroplated nonmagnetic metal of the pad layer, leaving the patterned silicon nitride on the ELG layer, which is typically Au, as shown in FIG. 6A. The ELG area is then ion milled, using the patterned silicon nitride as a mask, leaving the patterned silicon nitride and underlying ELG layer, as shown in FIG. 6B. The silicon nitride is then etched away using RIE, leaving the patterned ELG with back edge 79, as shown in FIG. 6C.

The silicon nitride is also removed from over the WP 142 by RIE, leaving the pad layer 152 and seed layer 157, as shown in FIG. 7A. A thin (about 5 nm) CoFe layer 181 is then deposited over the structure, as shown in FIG. 7B, to form a seed layer for later electroplating of the TS material. Next, as shown in FIG. 7C, a second photoresist layer (PR2) is deposited and patterned over the structure to define the shape of the TS. The PR2 material may be the same as the PR1 material. The back edge 178 of PR2 corresponds to where the back edge 178 of TS 150 (FIG. 2B) will be located. The TS material, typically NiFe, is then electroplated as layer 150 over the structure not covered by PR2 to a thickness of about 1-3 microns, as shown in FIG. 7D. The PR2 is then stripped.

After formation of the TS 150 and stripping of the PR2, the wafer is cut along line 75 and then lapped. FIG. 8 illustrates this process. The lapping may be done on a row of wafers, or at the individual slider level after the sliders are cut from the rows. The lapping is performed along a plane parallel to cut line 75, and in the direction shown by the arrow in FIG. 8. During lapping the electrical resistance of the ELG is monitored. The resistance decreases generally proportionally with the amount of ELG material that is removed. The electrical resistance of the amount of ELG material between line 77 and back edge 79 (FIG. 4A) is known. When this predetermined resistance value is achieved lapping stops. This defines generally the ABS and thus the TS-TH because the back edge 79 has been aligned with the front edge 170 of the pad layer 152.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A perpendicular magnetic recording write head for magnetizing regions in data tracks of a magnetic recording layer comprising:
   a substrate;
   a magnetic write pole (WP) comprising a layer of magnetic material formed on the substrate, the WP having a cross-track width at an end facing the recording layer and a wider cross-track width at a region recessed from the end, the WP having a throat height from its end to a transition point where its width transitions to its wider width;
   a nonmagnetic gap layer on the WP;
   a nonmagnetic metal seed layer on the gap layer for enabling electroplating on the seed layer;
   a nonmagnetic metal pad layer electroplated on the seed layer and having a front edge recessed from the WP end; and
   a trailing shield (TS) comprising a layer of magnetically permeable material on the WP layer and pad layer, the TS having an end generally coplanar with the WP end and having a cross-track width substantially wider than the WP's cross-track width, the TS having a throat height (TH) from its end to the pad layer front edge.

2. The write head of claim 1 wherein the TS has a notch facing the WP and having a width generally equal to the WP's cross-track width.

3. The write head of claim 1 wherein the pad layer has a lip in contact with the seed layer and located between the WP end and the pad layer front edge.

4. The write head of claim 1 further comprising side shields of magnetically permeable material on the substrate spaced on opposite sides of the WP in the cross-track direction, the side shields having ends substantially coplanar with the WP end.

5. The write head of claim 4 wherein the sides shields are connected to the TS to form a wraparound shield (WAS).

6. The write head of claim 1 wherein the nonmagnetic metal pad layer is formed of a material selected from the group consisting of NiP, Cu and Pd.

7. The write head of claim 1 wherein the write head is a disk drive perpendicular recording write head having an air-bearing surface (ABS) oriented generally parallel to the disk surface during operation of the disk drive, wherein the recording layer is on the disk, and wherein the WP end facing the recording layer is located substantially at the ABS.

* * * * *